United States Patent
Galvin, Jr. et al.

(10) Patent No.: US 10,650,101 B2
(45) Date of Patent: *May 12, 2020

(54) CONTEXT BASED DOCUMENT ANALYSIS

(71) Applicant: International Business Machines Corporation, Armonk, NY (US)

(72) Inventors: James Patrick Galvin, Jr., Georgetown, KY (US); Andrew Lewis Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,425

(22) Filed: Aug. 22, 2018

(65) Prior Publication Data

US 2018/0357222 A1 Dec. 13, 2018

Related U.S. Application Data

(63) Continuation of application No. 15/285,575, filed on Oct. 5, 2016, now Pat. No. 10,133,730, which is a continuation of application No. 13/780,550, filed on Feb. 28, 2013, now Pat. No. 9,535,900.

(51) Int. Cl.
  *G06F 17/27* (2006.01)
  *G06F 17/24* (2006.01)
(52) U.S. Cl.
  CPC ........ *G06F 17/2785* (2013.01); *G06F 17/241* (2013.01)
(58) Field of Classification Search
  None
  See application file for complete search history.

(56) References Cited

U.S. PATENT DOCUMENTS

| | | | |
|---|---|---|---|
| 7,194,693 B2 | 3/2007 | Cragun et al. | |
| 7,712,024 B2 | 5/2010 | Reynar et al. | |
| 9,535,900 B2 | 1/2017 | Galvin, Jr. | |
| 10,133,730 B2 | 11/2018 | Galvin, Jr. | |
| 2004/0135814 A1* | 7/2004 | Vendelin, Jr. | G06F 17/241 |
| | | | 715/802 |
| 2006/0047502 A1 | 3/2006 | Ramsey | |
| 2009/0049144 A1 | 2/2009 | Suzuki | |
| 2011/0191433 A1 | 8/2011 | Du | |
| 2011/0191693 A1 | 8/2011 | Baggett et al. | |
| 2011/0276897 A1 | 11/2011 | Crevier | |
| 2013/0254232 A1 | 9/2013 | Reimer | |

OTHER PUBLICATIONS

Scerri, et al., "Semanta—Semantic Email in Action," Digital Enterprise Research Institute, 2009, pp. 1-5.
http://pubpages.unh.edu/~jds/NewOrleans.htm, Shotter, John, "Expressing and Legitimating Actionable Knowledge From Within the Moment of Acting", The Academy of Management Conference in New Orleans, Aug. 21, 2004, pp. 1-7.

* cited by examiner

*Primary Examiner* — Qian Yang
(74) *Attorney, Agent, or Firm* — Ewa M. Wozniak

(57) ABSTRACT

A method, computer program product, and computer system for identifying, by a computing device, content in a document, wherein the content includes a language expression. A context of the language expression is determined from a defined range of the content in the document. An action item associated with the language expression is generated based upon, at least in part, the context of the language expression.

21 Claims, 9 Drawing Sheets

From: User 48

To: User 46, John Smith

Subject: The TPS Report Due This Friday

Hi everyone,

I hope you all had a pleasant weekend. I had a great time at the county fair, but I ate way too much fried food.

I am writing this email because the TPS report for the Donovan account is due this Friday. User 46 is responsible for sending me a draft so that I may review it. User 46, will the TPS report be ready for my review by this Thursday?

Please let me know and remember that you must include Jane Smith on any communication involving the TPS report for the Donovan account.

Sincerely,

User 48

FIG. 5

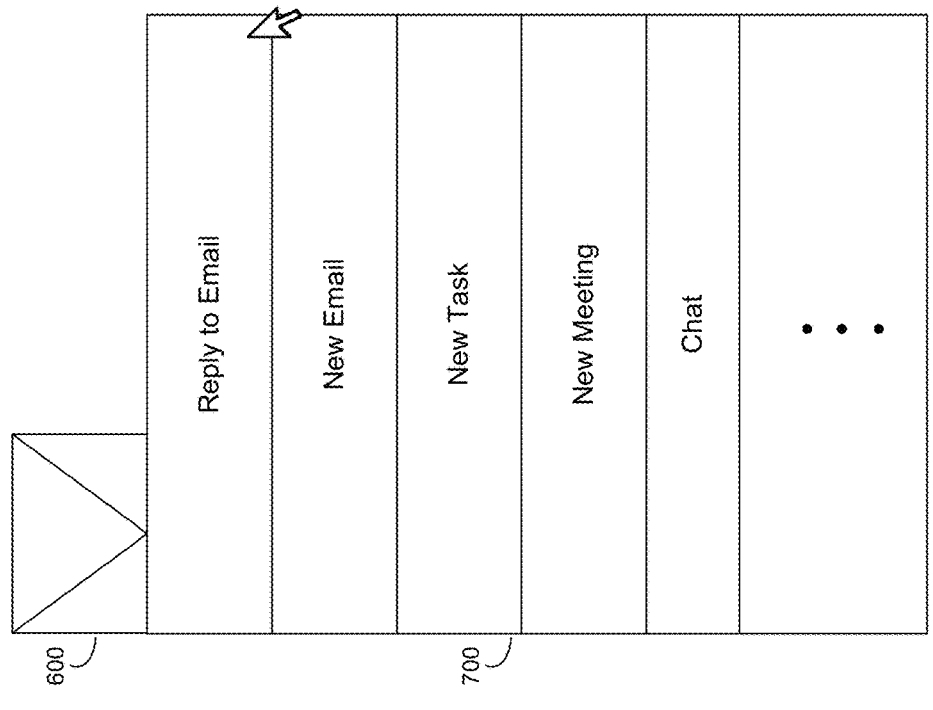

From: User 48

To: User 46, John Smith

Subject: The TPS Report Due This Friday

Hi everyone,

I hope you all had a pleasant weekend. I had a great time at the county fair, but I ate way too much fried food.

I am writing this email because the TPS report for the Donovan account is due this Friday. User 46 is responsible for sending me a draft so that I may review it. User 46, will the TPS report be ready for my review by this Thursday?

Please let me know and remember that you must include Jane Smith on any communication involving the TPS report for the Donovan account.

Sincerely,

User 48

FIG. 8

CONTEXT BASED DOCUMENT ANALYSIS

RELATED APPLICATIONS

The subject application is a continuation application of U.S. patent application with Ser. No. 15/285,575, filed on Oct. 5, 2018, which is a continuation application of U.S. Pat. No. 9,535,900, Issue Date Jan. 3, 2017 with Ser. No. 13/780,550, filed on Feb. 28, 2013, the entire content of which are herein incorporated by reference.

BACKGROUND

Unstructured and/or semi-structured messages (e.g., emails, instant messages, SMS, documents, etc.) may include implicit or explicit calls to action (e.g., requests for information). For example, an email sent to a receiving user by a sending user may be lengthy and include one or more questions, such as, "what do we have to bring to the meeting on Friday?". With the increasing numbers and types of messages, users may become overwhelmed, causing them not to read everything in each message carefully, or at all.

For example, users may resort to skimming, hoping to glean sufficient information about the content of the message without reading the whole message in depth. This may result in lost information, missed responsibility, and incomplete work, which may lead to errors, failures, and social embarrassment.

BRIEF SUMMARY OF DISCLOSURE

In one implementation, a method, performed by one or more computing devices, comprises identifying, by a computing device, content in a document, wherein the content includes a language expression. A context of the language expression is determined from a defined range of the content in the document. An action item associated with the language expression is generated based upon, at least in part, the context of the language expression.

One or more of the following features may be included. The range of the content from which to determine the context of the language expression may be redefined. The action item may be modified based upon, at least in part, a new context of the language expression determined from the redefined range of the content. The defined range may include at least a portion of the content that is outside of the language expression. The action item, when executed, may include information from the content in the document. The action item, when executed, may include information from material referenced by the content in the document. The defined range of the content in the document may be annotated.

In another implementation, a computing system includes a processor and a memory configured to perform operations comprising identifying content in a document, wherein the content includes a language expression. A context of the language expression is determined from a defined range of the content in the document. An action item associated with the language expression is generated based upon, at least in part, the context of the language expression.

One or more of the following features may be included. The range of the content from which to determine the context of the language expression may be redefined. The action item may be modified based upon, at least in part, a new context of the language expression determined from the redefined range of the content. The defined range may include at least a portion of the content that is outside of the language expression. The action item, when executed, may include information from the content in the document. The action item, when executed, may include information from material referenced by the content in the document. The defined range of the content in the document may be annotated.

In another implementation, a computer program product resides on a computer readable storage medium that has a plurality of instructions stored on it. When executed by a processor, the instructions cause the processor to perform operations comprising identifying content in a document, wherein the content includes a language expression. A context of the language expression is determined from a defined range of the content in the document. An action item associated with the language expression is generated based upon, at least in part, the context of the language expression.

One or more of the following features may be included. The range of the content from which to determine the context of the language expression may be redefined. The action item may be modified based upon, at least in part, a new context of the language expression determined from the redefined range of the content. The defined range may include at least a portion of the content that is outside of the language expression. The action item, when executed, may include information from the content in the document. The action item, when executed, may include information from material referenced by the content in the document. The defined range of the content in the document may be annotated.

The details of one or more implementations are set forth in the accompanying drawings and the description below. Other features and advantages will become apparent from the description, the drawings, and the claims.

BRIEF DESCRIPTION OF THE DRAWINGS

FIG. 5 is an illustrative diagrammatic view of a screen image displayed by the analysis process of FIG. 1 according to one or more implementations of the present disclosure;

FIG. 7 is an illustrative diagrammatic view of a screen image displayed by the analysis process of FIG. 1 according to one or more implementations of the present disclosure;

FIG. 8 is an illustrative diagrammatic view of a screen image displayed by the analysis process of FIG. 1 according to one or more implementations of the present disclosure.

DETAILED DESCRIPTION

Figure 1:
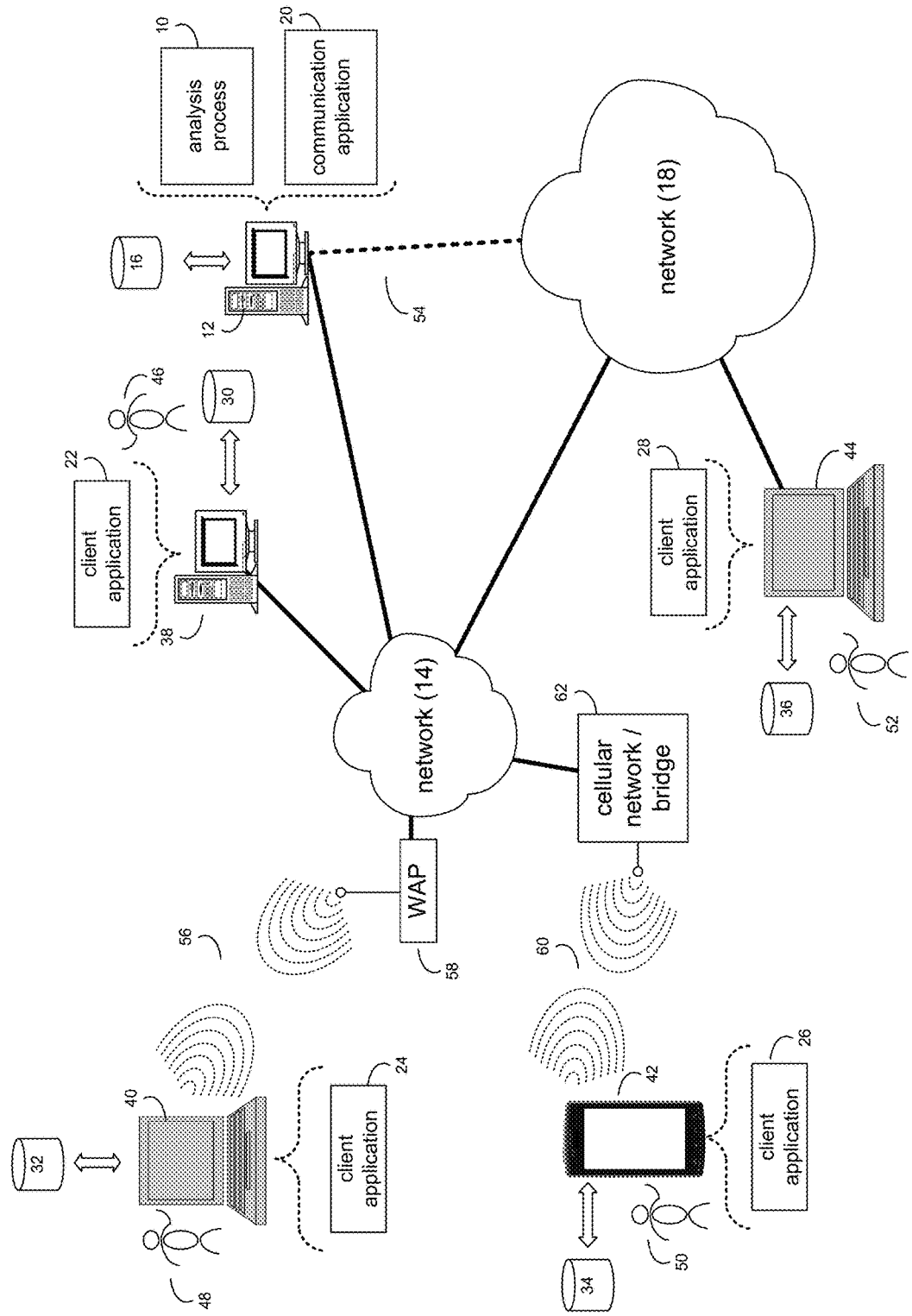
FIG. 1 is an illustrative diagrammatic view of an analysis process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java °, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown analysis process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, analysis process 10 may identify, by a computing device, content in a document, wherein the content may include a language expression. A context of the language expression may be determined from a defined range of the content in the document. An action item associated with the language expression may be generated based upon, at least in part, the context of the language expression.

The instruction sets and subroutines of analysis process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Analysis process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a communication application (e.g., communication application 20), examples of which may include, but are not limited to, e.g., an email application, an instant messaging application, a text messaging application, a word processing application, or other application that allows for the creation and/or transmission of documents (e.g., emails, instant messages, SMS, collaborative documents). Analysis process 10 and/or communication application 20 may be accessed via client applications 22, 24, 26, 28. Analysis process 10 may be a stand alone application, or may be an applet/application/script that may interact with and/or be executed within communication application 20 and/or one or more of client applications 22, 24, 26, 28. Communication application 20 may be a stand alone application, or may be an applet/application/script that may interact with and/or be executed within analysis process 10 and/or one or more of client applications 22, 24, 26, 28. One or more of client applications 22, 24, 26, 28 may be a stand alone application, or may be an applet/application/script that may interact with and/or be executed within analysis process 10 and/or communication application 20. Examples of client applications 22, 24, 26, 28 may include, but are not limited to, e.g., an email application, an instant messaging application, a text messaging application, a word processing application, or other application that allows for the creation and/or transmission of documents, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of analysis process 10 (and vice versa). Accordingly, analysis process 10 may be a purely server-side application, a purely client-side application, or a hybrid server-side/client-side application that is cooperatively executed by one or more of client applications 22, 24, 26, 28 and/or analysis process 10.

One or more of client applications 22, 24, 26, 28 may be configured to effectuate some or all of the functionality of communication application 20 (and vice versa). Accordingly, communication application 20 may be a purely server-side application, a purely client-side application, or a hybrid server-side/client-side application that is cooperatively executed by one or more of client applications 22, 24, 26, 28 and/or communication application 20. As one or more of client applications 22, 24, 26, 28, analysis process 10, and communication application 20, taken singly or in any combination, may effectuate some or all of the same functionality, any description of effectuating such functionality via one or more of client applications 22, 24, 26, 28, analysis process 10, communication application 20, or combination thereof, and any described interaction(s) between one or more of client applications 22, 24, 26, 28, analysis process 10, communication application 20, or combination thereof to effectuate such functionality, should be taken as an example only and not to limit the scope of the disclosure.

Users 46, 48, 50, 52 may access computer 12 and analysis process 10 (e.g., using one or more of client electronic devices 38, 40, 42, 44) directly through network 14 or through secondary network 18. Further, computer 12 may be connected to network 14 through secondary network 18, as illustrated with phantom link line 54. Analysis process 10 may include one or more user interfaces, such as browsers and textual or graphical user interfaces, through which users 46, 48, 50, 52 may access analysis process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
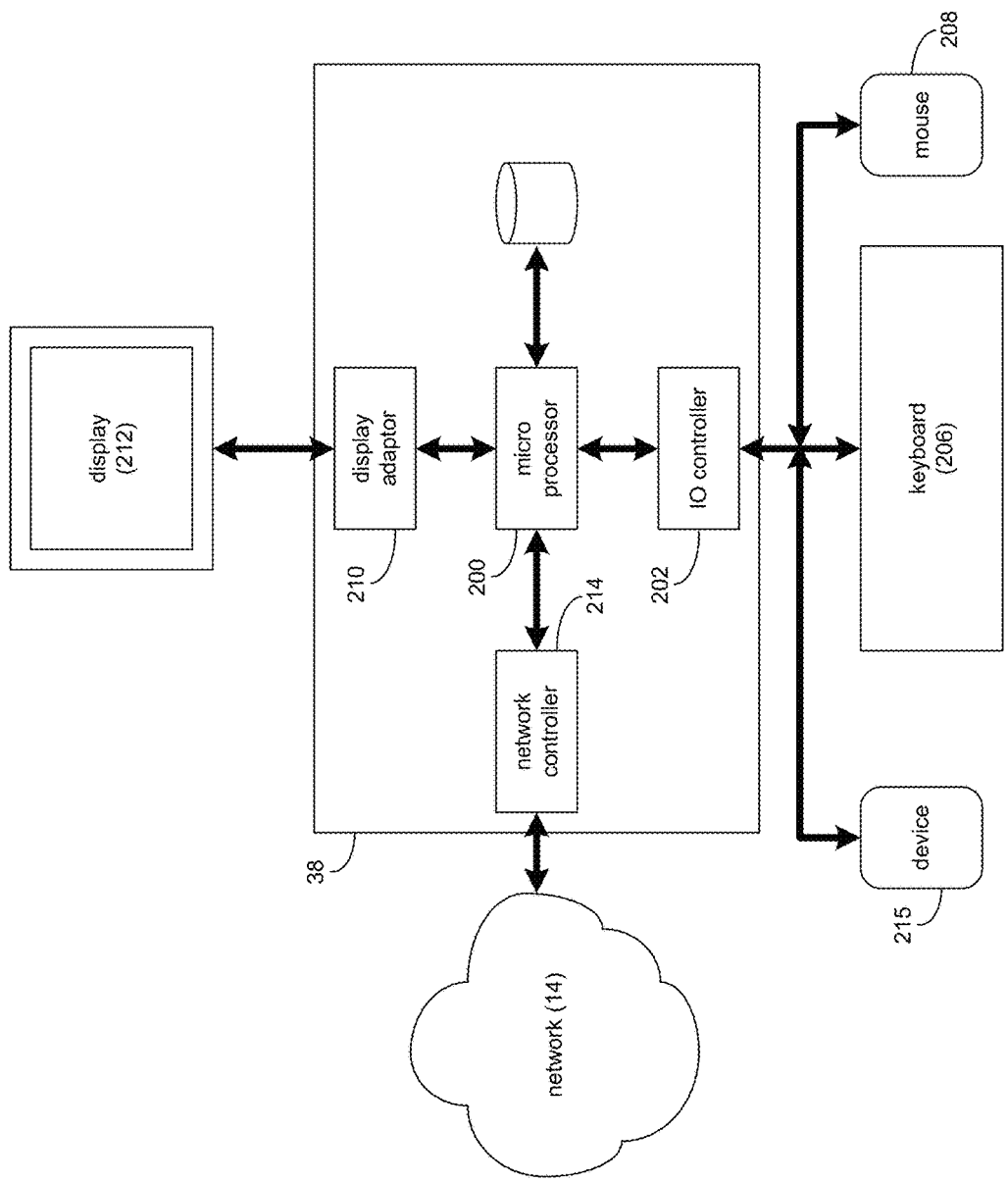
FIG. 2 is a diagrammatic view of a client electronic device of FIG. 1 according to one or more implementations of the present disclosure.
Figure 3:
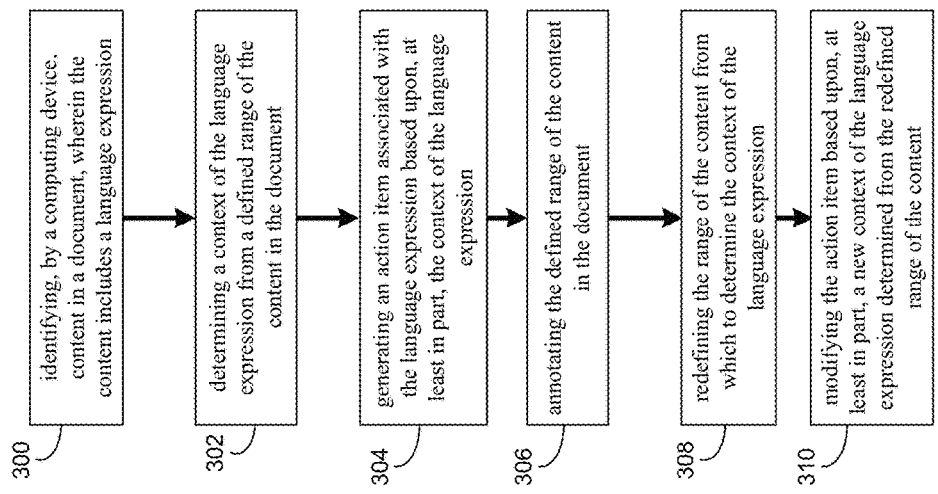
FIG. 3 is an illustrative flowchart of the analysis process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, analysis process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

In some implementations, analysis process 10 may use, e.g., pattern matching techniques to detect, e.g., telephone numbers, zip codes, email addresses, URLs, etc. that may be included in, e.g., an email. However, such pattern matching techniques may not include the appropriate context, which may result in inaccurate identification of what the "pattern" actually is. For example, a pattern matching technique may be used to identify a text pattern of "617-555-1234" in an email, which may identify the pattern as a phone number. However, when more context of the email is added to the analysis, analysis process 10 may determine that pattern of "617-555-1234" is not a phone number. For instance, the email may include the phrase, "When will the TPS report for account number 617-555-1234 be ready for my review?" In the example, analysis process 10 may determine that the pattern of "617-555-1234" is the account number associated with a particular TPS report, rather than a phone number.

As discussed above and referring also to FIGS. 3-9, analysis process 10 may identify 300, by a computing device, content in a document, wherein the content may include a language expression. Analysis process 10 may determine 302 a context of the language expression from a defined range of the content in the document. An action item associated with the language expression may be generated 304 by analysis process 10 based upon, at least in part, the context of the language expression.

Figure 4:
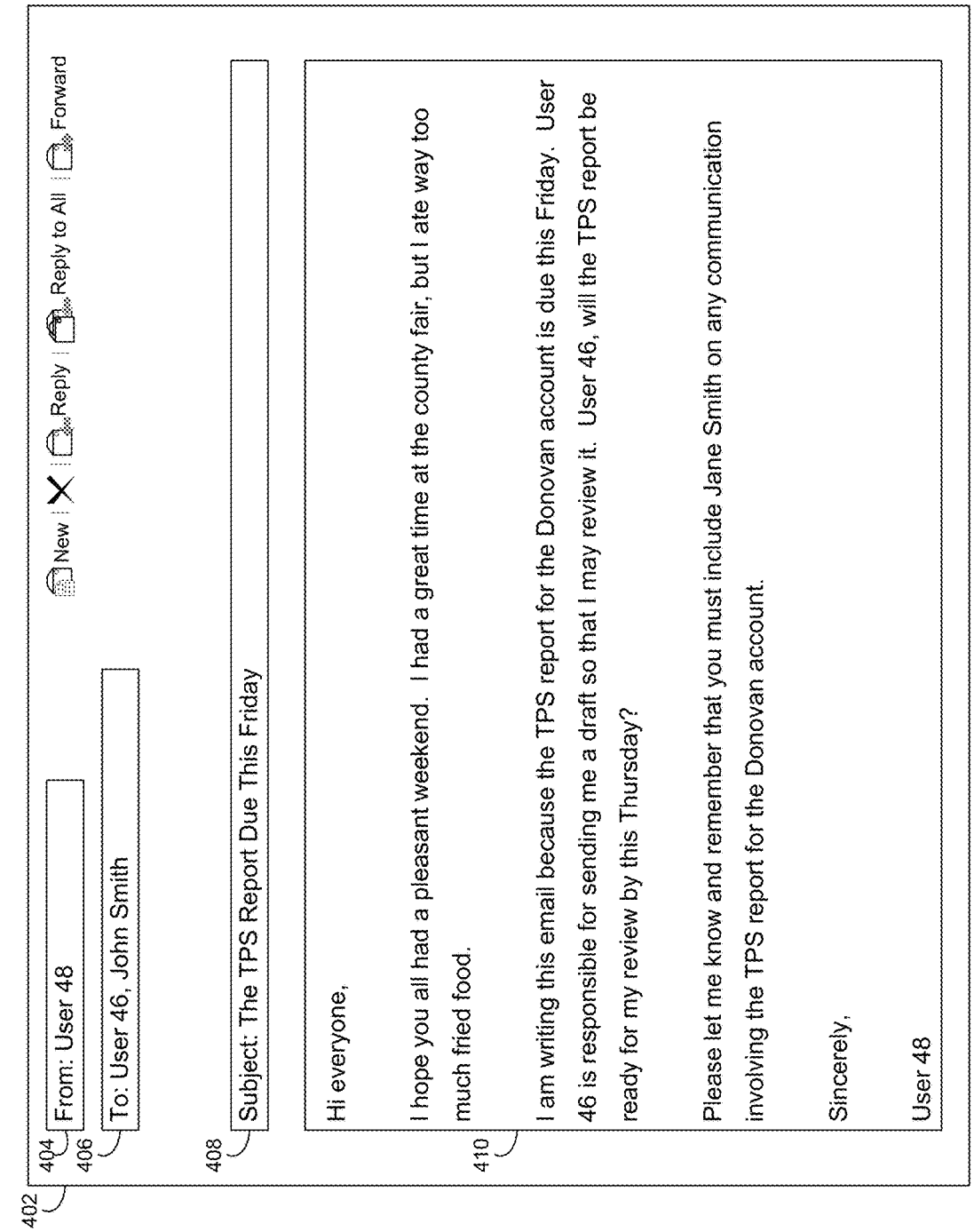
FIG. 4 is an illustrative diagrammatic view of a screen image displayed by the analysis process of FIG. 1 according to one or more implementations of the present disclosure.
Figure 6:
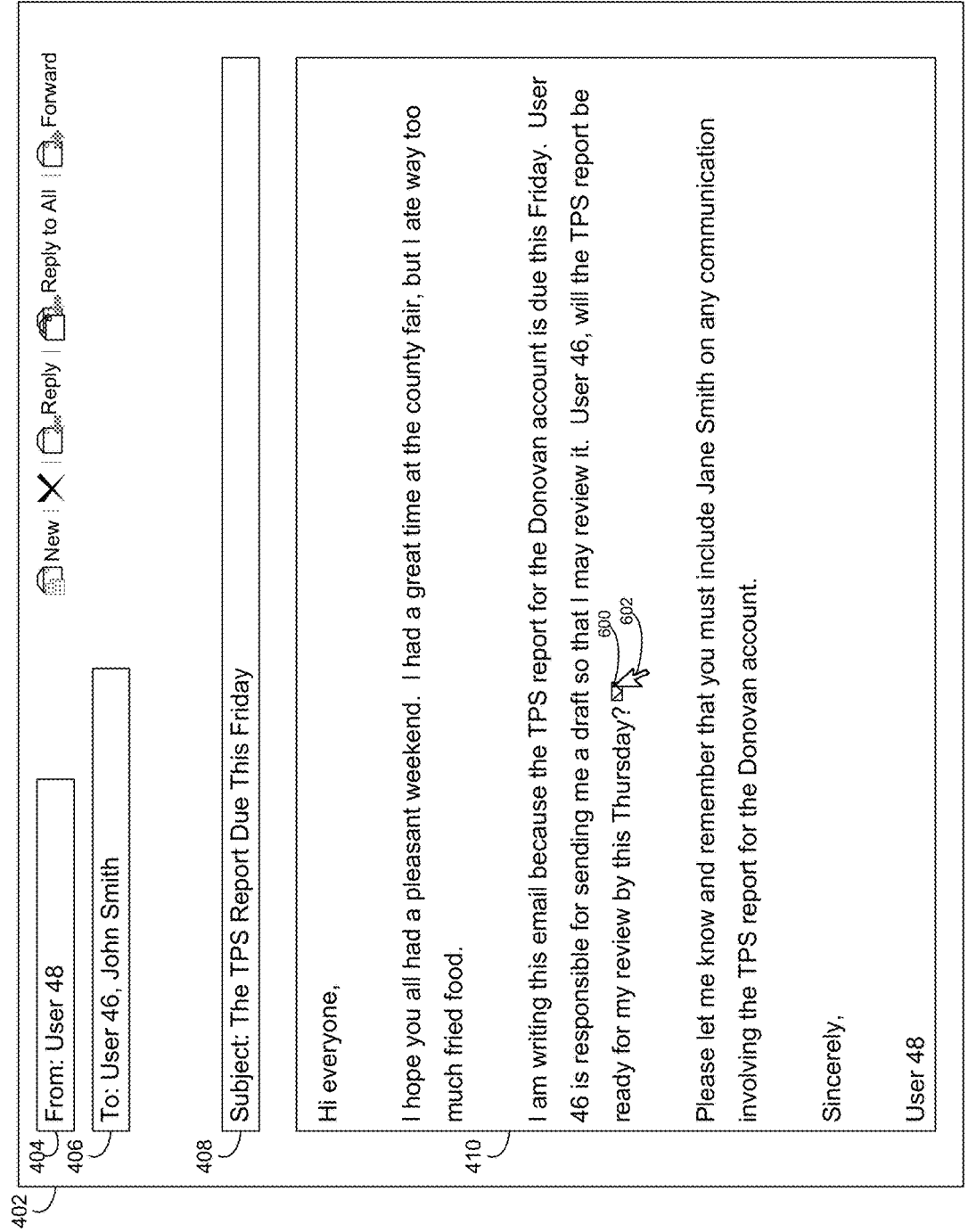
FIG. 6 is an illustrative diagrammatic view of a screen image displayed by the analysis process of FIG. 1 according to one or more implementations of the present disclosure.
Figure 9:
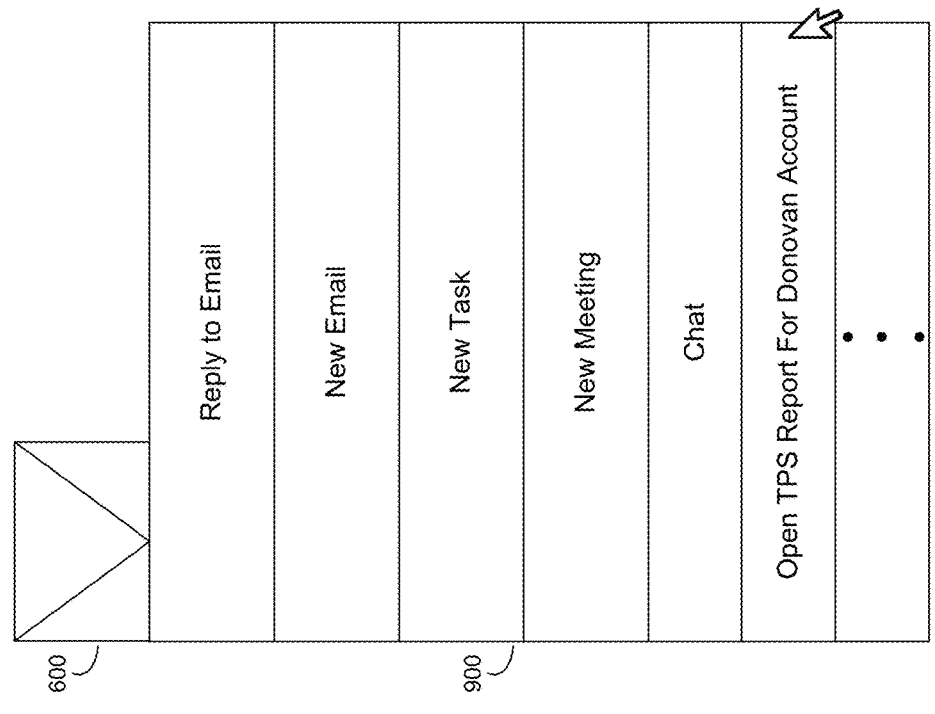
FIG. 9 is an illustrative diagrammatic view of a screen image displayed by the analysis process of FIG. 1 according to one or more implementations of the present disclosure.

For instance, and referring at least to FIG. 4, assume for example purposes only that a first user (e.g., user 48) drafts a document (e.g., email) to a second user (e.g., user 46). User 46 may receive and view on client electronic device 38 the email sent by user 48 (e.g., via analysis process 10, communication application 20, client application 26, or combination thereof). For example, analysis process 10, communication application 20, client application 26, or combination thereof, may be associated with user interface 400, which may enable user 46 to view the email (e.g., email 402) via client electronic device 38.

In some implementations, and continuing with the above example, analysis process 10 may identify 300, by a computing device (e.g., client electronic device 38), content in a document, wherein the content may include a language expression. In the example, the document is email 402, however, the document may be any type of document (e.g., instant message, text message, SMS messages, collaborative document, social software board post, meeting minutes, web page, etc.) without departing from the scope of the disclosure. The content of email 402 may include any portion of email 402, including but not limited to From portion 404, To portion 406, Subject portion 408, and body portion 410.

In the example, the language expression may include but is not limited to a question (e.g., "User 46, will the TPS report be ready for my review by this Thursday?"). Other examples of language expressions, such as statements, may also be used without departing from the scope of the disclosure. Analysis process 10 may identify 300 the language expression in the content of email 402 using known techniques such as, e.g., those used in grammar checking applications, as well as other techniques.

In some implementations, analysis process 10 may determine 302 a context of the language expression from a defined range of the content in the document. For example, and referring at least to FIG. 5, the defined range (e.g., range 500) of the content in email 402 may include some or all of the sentence between brackets 502a and 502b (e.g., "User 46, will the TPS report be ready for my review by this Thursday?"). From range 500, analysis process 10 may determine the context of the question includes user 48 asking user 46 whether the TPS report will be ready for user 48 to review by Thursday.

In some implementations, the defined range of the content in the document may be annotated 306 by analysis process 10. For example, the defined range (e.g., range 500) of the content in email 402 that may include some or all of the sentence between brackets 502a and 502b may be highlighted, bolded, italicized, changed font size/color, as well as other annotations.

In some implementations, an action item associated with the language expression may be generated 304 by analysis process 10 based upon, at least in part, the context of the language expression. For example, and referring at least to FIG. 6, analysis process 10 may render an icon or other object (e.g., object 600) in the email or elsewhere. Object 600 may include, for example, a dropdown menu, hotlinks, etc. In the example, object 600 may be rendered at the end of the sentence that includes the above-noted language expression. User 46 may, e.g., via analysis process 10, select object 600 with, e.g., curser 602. In the example, and referring now at least to FIG. 7, selecting object 600 may result in a dropdown menu (e.g., dropdown menu 700) being rendered by analysis process 10, which may include one or more action items associated with the language expression and the context.

For instance, the action items generated 304 based upon, at least in part, the context of the language expression, may include but are not limited to Reply to Email, New Email, New Task, New Meeting, Chat, etc. In the example, user 46 selecting Reply to Email action item may cause analysis process 10 to execute the Reply to Email action item and generate a Reply email (e.g., to user 48). As another example, user 46 selecting New Email action item may cause analysis process 10 to execute the New Email action item and generate a new email (e.g., to user 48). As another example, user 46 selecting New Task action item may cause analysis process 10 to execute the New Task action item and generate a new task. For instance, client application 26 may include, e.g., a calendaring function with the ability to create a task in a to-do list that may include the delegated task of user 46 responding to the question of user 48, sending a draft of the TPS report to user 48, as well as other tasks determined based upon, at least in part, the context of the language expression. The task may be associated with a due date of Thursday derived from the context of, e.g., the language expression or other content. As another example, user 46 selecting New Meeting action item may cause analysis process 10 to execute the New Meeting action item and generate a new meeting request. For instance, client application 26 may include a calendaring function with the ability to create a meeting request between user 46 and user 48, where the subject of the meeting may include a discussion of the TPS report, as well as other subjects associated with the context. As another example, user 46 selecting Chat action item may cause analysis process 10 to execute the Chat action item and generate a chat session or chat request. For instance, client application 26 may include an online collaboration or chat function with the ability to create the chat session or request with user 46 and user 48 (and/or other referenced users from the context), where the subject of the chat may include a discussion of the TPS report, as well as other subjects associated with the context.

In some implementations, the action item, when executed, may include information from material referenced by the content in the document. For instance, assume for example purposes only that user 46 selects Reply to Email action item that causes analysis process 10 to execute the Reply to Email action item and generate a reply email (e.g., to user 48 or other referenced users). In the example, analysis process 10 may determine, e.g., from the content of range 500, the context of the question includes user 48 asking user 46 whether the TPS report will be ready for user 48 to review by Thursday. Based upon, at least in part, the context of the question from the content of range 500 (e.g., user 48 asking user 46 whether the TPS report will be ready for user 48 to review by Thursday), analysis process 10 may generate a reply email from user 46 to user 48, which may include one or more excerpts from the referenced TPS report (assuming enough context is available in the content of range 500 for analysis process 10 to determine which TPS report is being referenced). In some implementations, the excerpts may be suggested by analysis process 10, e.g., in object 600, based upon, at least in part, the above-noted context. For example, if the content of range 500 included a discussion of a particular paragraph number of the TPS report, or a reference to a particular portion of the TPS report (e.g., "beginning of the second sentence of the TPS report"), that portion of the TPS report may be suggested by analysis process 10 to be included in the reply email.

In some implementations, the defined range may include at least a portion of the content that is outside of the language expression. For example, analysis process 10 may determine 302 the context the language expression based upon, at least in part a defined range that includes various other portions of email 402. For instance, the content of email 402 that includes " . . . remember that you must include Jane Smith on any communication involving the TPS report . . . " may not be part of the above-noted language expression in the example, but may still be used by analysis process 10 to determine 302 the context of the language expression. In the above-example where user 46 selects the Reply to Email action item, analysis process 10 may thus generate a reply email to user 48 from user 46 which may include Jane Smith as a recipient, even if Jane Smith was not originally listed in the prior email. Analysis process 10 may search for the email address of Jane Smith in any previously stored contact information accessible by analysis process 10, previously received emails from Jane Smith, the internet, as well as other locations.

Similarly, the action item, when executed, may include information from the content in the document. Information from the content in the document (e.g., email) may include, for example, references to other people. For example, continuing with the above example noting the content of email 402 includes the phrase " . . . remember that you must include Jane Smith on any communication involving the TPS report . . . ", when user 46 selects the Reply to Email action item, analysis process 10 may thus generate a reply email to user 48 from user 46 which may include Jane Smith as a recipient, even if Jane Smith was not originally listed in the prior email. Other examples of information from the content in the document may include but are not limited to the recipients of the email, the sender of the email, references to companies, project names, concepts, data formats, time references, etc. As another example, a Reply to Email action item may cause analysis process 10 to generate a reply email to user 48 from user 46 where, e.g., the subject of the reply email includes at least a portion of the language expression (e.g., "User 46, will the TPS report be ready for my review by this Thursday?").

In some implementations, the range of the content from which to determine the context of the language expression may be redefined 308 by analysis process 10. For example, and referring at least to FIG. 8, user interface 400 (e.g., via analysis process 10), may enable user 46 to redefine 308 the range of the content from which to determine the context of the language expression. For instance, user 46 may use curser 602 to "left click" and drag curser 602 across portions of the content to be selected, and, therefore, to be included in the new range. In some implementations, user interface 400 (e.g., via analysis process 10), may enable user 46 to "right click" on the selected portions of the content included in the new range, which may cause analysis process 10 to generate 304 object 600 or window 700 with one or more action items. In some implementations, user interface 400 (e.g., via analysis process 10), may enable user 46 to redefine 308 the range of the content from which to determine the context of the language expression by using curser 602 to reposition brackets (e.g., brackets 502a and 502b), where the content within brackets 502a and 502b denote the range. In some implementations, user interface 400 (e.g., via analysis process 10), may enable user 46 to define the range of the content from which to determine the context of the language expression before and/or after analysis process 10 define the range of the content. As such, the term "redefine" may but need not denote a prior defined range of the content from which to determine the context of the language expression.

In some implementations, the action item may be modified 310 by analysis process 10 based upon, at least in part, a new context of the language expression determined from the redefined range of the content. For example, and referring at least to FIG. 9, selecting object 600 may result in a dropdown menu (e.g., dropdown menu 900) being rendered by analysis process 10, which may include one or more action items associated with the language expression and the context. In the example, and referring also at least to FIG. 7, assume that the range of the content from which to determine the context of the language expression only includes the content in email 402 between brackets 502a and 502b (e.g., "User 46, will the TPS report be ready for my review by this Thursday?"). From that range, analysis process 10 may determine the context of the question includes user 48 asking user 46 whether the TPS report will be ready for user 48 to review by Thursday and may generate 304 an action item that may include Open TPS Report. However, further assume that the range of the content from which to determine the context of the language expression has been redefined 308 to now include the content in email 402 between brackets 502a and 502b shown in FIG. 8. (e.g., "I am writing this email because the TPS report for the Donovan account is due this Friday. User 46, will the TPS report be ready for my review by this Thursday?"). In the example, from the redefined range, analysis process 10 may (e.g., using semantic analysis to correlate TPS report specifically with the Donovan account) determine the context of the question includes user 48 asking user 46 whether the TPS report for the Donovan account will be ready for user 48 to review by Thursday and may generate 304 an action item (e.g., via dropdown menu 900) that may include Open TPS Report For Donovan account. In some implementations, analysis process 10 may generate a reply email from user 46 to user 48, which may include a copy of the TPS report for the Donovan account (e.g., as an attachment or link to where the TPS report may be located that when selected may retrieve and/or open the TPS report). That is, by redefining 308 the range of the content from which to determine the context of the language expression, more or less contextual information may be gleaned from the content from which to generate 304 or redefine one or more of the action items. In some implementations, one or more of the action items may be executed automatically by analysis process 10. For example, analysis process 10 may automatically include a copy of the TPS report for the Donovan account in a reply email.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   identifying, by a computing device, content in a document, wherein the content includes a language expression;
   determining a context of the language expression from a defined range of the content in the document;
   providing a selectable object in a graphical user interface associated with the document; and
   generating an action item in response to a user selection of the selectable object, the action item associated with the language expression based upon, at least in part, the context of the language expression, wherein the action item generates a reply email automatically, at least one recipient of the reply email including another user referenced in the document, wherein the another user was not an original recipient of the document.

2. The computer-implemented method of claim 1 further comprising redefining the range of the content from which to determine the context of the language expression.

3. The computer-implemented method of claim 2 further comprising modifying the action item based upon, at least in part, a new context of the language expression determined from the redefined range of the content.

4. The computer-implemented method of claim 1 wherein the defined range includes at least a portion of the content that is outside of the language expression.

5. The computer-implemented method of claim 1 wherein the action item, when executed, includes information from the content in the document.

6. The computer-implemented method of claim 1 wherein the action item, when executed, includes information from material referenced by the content in the document.

7. The computer-implemented method of claim 1 further comprising annotating the defined range of the content in the document.

8. A computing system including a processor and a memory configured to perform operations comprising:
  identifying, by a computing device, content in a document, wherein the content includes a language expression;
  determining a context of the language expression from a defined range of the content in the document;
  providing a selectable object in a graphical user interface associated with the document; and
  generating an action item in response to a user selection of the selectable object, the action item associated with the language expression based upon, at least in part, the context of the language expression, wherein the action item generates a reply email automatically, at least one recipient of the reply email including another user referenced in the document, wherein the another user was not an original recipient of the document.

9. The computing system of claim 8 further comprising redefining the range of the content from which to determine the context of the language expression.

10. The computing system of claim 9 further comprising modifying the action item based upon, at least in part, a new context of the language expression determined from the redefined range of the content.

11. The computing system of claim 8 wherein the defined range includes at least a portion of the content that is outside of the language expression.

12. The computing system of claim 8 wherein the action item, when executed, includes information from the content in the document.

13. The computing system of claim 8 wherein the action item, when executed, includes information from material referenced by the content in the document.

14. The computing system of claim 8 further comprising annotating the defined range of the content in the document.

15. A computer program product residing on a computer readable storage device having a plurality of instructions stored thereon which, when executed by a processor, cause the processor to perform operations comprising:
  identifying, by a computing device, content in a document, wherein the content includes a language expression;
  determining a context of the language expression from a defined range of the content in the document;
  providing a selectable object in a graphical user interface associated with the document; and
  generating an action item in response to a user selection of the selectable object, the action item associated with the language expression based upon, at least in part, the context of the language expression, wherein the action item generates a reply email automatically, at least one recipient of the reply email including another user referenced in the document, wherein the another user was not an original recipient of the document.

16. The computer program product of claim 15 further comprising redefining the range of the content from which to determine the context of the language expression.

17. The computer program product of claim 16 further comprising modifying the action item based upon, at least in part, a new context of the language expression determined from the redefined range of the content.

18. The computer program product of claim 15 wherein the defined range includes at least a portion of the content that is outside of the language expression.

19. The computer program product of claim 15 wherein the action item, when executed, includes information from the content in the document.

20. The computer program product of claim 15 wherein the action item, when executed, includes information from material referenced by the content in the document.

21. The computer program product of claim 15 further comprising annotating the defined range of the content in the document.

* * * * *